(12) United States Patent
Benedick et al.

(10) Patent No.: US 11,411,367 B2
(45) Date of Patent: Aug. 9, 2022

(54) OPTICAL FILTERING TO STABILIZE FIBER AMPLIFIERS IN THE PRESENCE OF STIMULATED BRILLOUIN SCATTERING

(71) Applicant: Massachusetts Institute of Technology, Cambridge, MA (US)

(72) Inventors: Andrew Benedick, Stow, MA (US); Kevin Creedon, Belmont, MA (US); John J. Zayhowski, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 199 days.

(21) Appl. No.: 16/826,372

(22) Filed: Mar. 23, 2020

(65) Prior Publication Data

US 2020/0373728 A1 Nov. 26, 2020

Related U.S. Application Data

(60) Provisional application No. 62/851,691, filed on May 23, 2019.

(51) Int. Cl.
*H01S 3/00* (2006.01)
*H01S 3/30* (2006.01)
(Continued)

(52) U.S. Cl.
CPC .......... *H01S 3/302* (2013.01); *H01S 3/0064* (2013.01); *H01S 3/06779* (2013.01); *H01S 3/08027* (2013.01)

(58) Field of Classification Search
None
See application file for complete search history.

(56) References Cited

U.S. PATENT DOCUMENTS 7,558,480 B2 7/2009 Bickham
7,692,849 B2 4/2010 Shukunami et al.
(Continued)

FOREIGN PATENT DOCUMENTS

WO WO 2019077090 A1 * 4/2019 ......... H04B 10/2537

OTHER PUBLICATIONS

Choudhury et al., "Observation of visible light flashes in high power, near infrared, narrow-linewidth fiber lasers and its potential use as a visual monitor for stimulated Brillouin scattering." Real-time Measurements, Rogue Phenomena, and Single-Shot Applications IV. vol. 10903. International Society for Optics and Photonics, 2019. 7 pages.

(Continued)

*Primary Examiner* — Mark Hellner
(74) *Attorney, Agent, or Firm* — Smith Baluch LLP

(57) ABSTRACT

Multi-stage fiber amplifiers can amplify signals from a few Watts to several kilowatts. These amplifiers are limited in power by intensity instabilities resulting from a sequence of nonlinear optical effects. These nonlinear optical effects include stimulated Brillouin scattering (SBS), with produces a high-intensity pulse close to the signal wavelength that propagates backward up the amplifier chain, causing permanent damage to the upstream components. This SBS pulse can be blocked by an optical isolator that blocks backward-propagating light at or near the signal wavelength. At high enough power levels, the SBS pulse can also induce backward-propagating light at wavelengths tens to hundreds of nanometers away from the signal wavelength. This SBS-Pulse Induced Non-linear Spectrum light is outside the isolator's reject band, so it can propagate upstream and de-stabilize the upstream amplifier stages. It can be suppressed using a filter with a broad reject band and a suppression ratio of ≥30 dB, enabling higher power operation.

16 Claims, 6 Drawing Sheets

(51) Int. Cl.
  *H01S 3/08* (2006.01)
  *H01S 3/067* (2006.01)

(56) References Cited

U.S. PATENT DOCUMENTS

| 7,764,719 | B2 | 7/2010 | Munroe et al. |
| 2008/0219300 | A1 | 9/2008 | Krupkin et al. |
| 2012/0263197 | A1* | 10/2012 | Koplow ................ G02B 6/274 372/6 |

OTHER PUBLICATIONS

Ma et al., "Propagation-length independent SRS threshold in chirally-coupled-core fibers," Optics Express 19, 22575-22581 (2011). 7 pages.

Panbhiharwala et al., "Investigation of temporal dynamics due to stimulated Brillouin scattering using statistical correlation in a narrow-linewidth cw high power fiber amplifier." Optics Express 26.25 (2018): 33409-33417.

Garmire, "Stimulated Brillouin review: invented 50 years ago and applied today." International Journal of Optics 2018 (2018). 18 pages.

International Search Report and Written Opinion in International Patent Application No. PCT/US2020/024141 dated Jul. 2, 2020, 11 pages.

* cited by examiner

OPTICAL FILTERING TO STABILIZE FIBER AMPLIFIERS IN THE PRESENCE OF STIMULATED BRILLOUIN SCATTERING

CROSS-REFERENCE TO RELATED APPLICATION(S)

This application claims the priority benefit, under 35 U.S.C. 119(e), of U.S. Application No. 62/851,691, which was filed on May 23, 2019, and is incorporated herein by reference in its entirety.

GOVERNMENT SUPPORT

This invention was made with Government support under Grant No. FA8702-15-D-0001 awarded by the U.S. Air Force. The Government has certain rights in the invention.

BACKGROUND

Kilowatt-class, high-power fiber amplifiers are used for material processing and directed energy systems. These amplifiers typically comprise several stages of amplification. For illustrative purposes, FIG. 1 shows a schematic depiction of two stages of a multi-stage, high-power fiber amplifier 100. A low-power, continuous-wave (CW) optical input 101 from a seed laser (not shown) propagates through a first optical isolator 102 to a lower-power amplification stage 110 with a gain of about, e.g., 20 dB. The amplified output of the lower-power amplification stage 110 serves as a seed 111 for a higher-power amplification stage 120 in series with the lower-power amplification stage 110. The seed 111 propagates through a second optical isolator 112 to the higher-power amplification stage 120, which emits a high-power optical output 199. The gain of the higher-power amplification stage 120 is typically about 20 dB, giving an amplified spontaneous emission (ASE) noise pedestal about 40 dB below the signal level when measured with 0.1 nm spectral resolution.

Proper, stable operation of a higher-power stage in a multi-stage, high-power fiber amplifier involves a sufficiently powerful input laser beam (a seed) from the previous stage of the multi-stage, high-power fiber amplifier. Insufficient seed power will de-seed the higher-power amplification stage, resulting in unstable operation and potentially catastrophic failure. For kW class amplifiers, the seed power should be at least 5 W. More generally, a reduction in the seed power to <20% of the seed power's nominal value could be destabilizing, especially for a transient disruption.

Feedback from the higher-power amplification stage to the preceding lower-power amplification stage can disrupt or interrupt the lower-power amplification stage's output and de-seed the higher-power amplification stage. A loss-of-seed condition should, therefore, be avoided to ensure proper operation of the multi-stage, high-power fiber amplifier.

Reflections from the output facet of an amplifier's output fiber and backward-propagating stimulated Brillouin scattering (SBS) can cause feedback into the previous amplifier stage. To protect the previous stage from feedback, optical isolators are used between stages. A typical optical isolator has an isolation bandwidth of about 10 nm to about 20 nm centered at the operating wavelength of the amplifier and blocks reflections from the output facet and backward-propagating SBS.

SUMMARY

SBS can occur in fiber amplifier systems that amplify CW light or pulses with durations on the order of a nanosecond or longer. (Pulses shorter than 100 ps usually have enough bandwidth to suppress SBS.) The inventors have recognized that backward-propagating SBS in a kilowatt-class, high-power fiber amplifier can be intense enough to induce stimulated Raman scattering (SRS), Self-Phase Modulation (SPM), and/or Four-Wave Mixing (FWM), producing backward-propagating light with an SBS-Pulse Induced Nonlinear Spectrum (SPINS). Without being bound to any particular theory, much of this undesired spectrum generation occurs at very high power levels (e.g., >100 kW) in response to temporal changes in intensity (pulses), although SRS can occur as a CW process.

These nonlinear processes can occur in the gain fiber of the downstream amplifier stage, the fiber connecting the upstream and downstream amplifier stages, or both. For example, a 3-5 meter length of fiber connecting upstream and downstream amplifier stages could be long enough to generate SPINs light if illuminated with a backward-propagating SBS pulse. For applications where the input signal has a constrained bandwidth, SPINS and SBS can limit the maximum input and output powers.

This SPINS light is wavelength-shifted by several tens of nanometers with respect to the SBS wavelength and falls outside of a typical isolator's isolation bandwidth. Because the SPINS light is outside the isolator's isolation bandwidth, the isolator does not protect the previous amplifier stage from SPINS light. Further, the backward-propagating SPINS light transmitted by the isolator can disrupt operation of the previous stage. More specifically, the SPINS light can cause a decrease in the output of the lower-power amplification stage, de-seeding the higher-power amplification stage.

Inserting a protective, SPINS-blocking notch filter between two stages in a multi-stage, high-power amplifier prevents disruption of an upstream (lower-power) amplifier stage from SPINS light that propagates backwards from a downstream (higher-power) amplifier stage. The notch in the filter passes (transmits) light at the operating wavelength of the amplifier, with a passband that is smaller than the isolation bandwidth of the isolator. With the exception of the notch, the filter should have high rejection (e.g., 30 dB or greater) over up to the entire gain bandwidth of the amplifier. When used in combination with the isolator, the filter protects the upstream (lower-power) amplifier stage from potentially disruptive feedback from the upstream (higher-power) amplifier stage, preventing an undesirable loss-of-seed condition at higher powers. This means that the amplifier can operate at higher output power levels than without the SPINS-blocking notch filter.

The SPINS-blocking filter should be positioned close enough (e.g., within 40 cm of) to the output of the lower-power amplifier stage to avoid or prevent generation of SPINS light in the passive fiber between the SPINS-blocking filter and the gain fiber of the lower-power stage. Positioning the SPINS-blocking filter closer to the output of the lower-power amplifier stage doesn't prevent generation of SPINS light, but it raises the threshold at which generation of SPINS light occurs. For many applications, it may be convenient to package the filter with the isolator between the lower-power and higher-power stages. Packaging the isolator with the filter can reduce insertion loss associated from coupling light into optical fiber.

A SPINS-blocking filter can be implemented in a multi-stage fiber amplifier as follows. The multi-stage fiber amplifier includes a first stage, a second stage, and a filter in optical communication with an output of the first stage and an input of the second stage. In operation, the first stage amplifies a signal beam. The second stage further amplifies the signal beam, which generates a backward-propagating stimulated Brillouin scattered (SBS) pulse. And the filter transmits the signal beam from the first stage to the second stage and prevents SBS-pulse induced non-linear spectrum (SPINS) light generated by the backward-propagating SBS pulse from propagating backward from the second stage to the first stage. This SPINS light can comprise light generated by at least one of stimulated Raman scattering, self-phase modulation, or four-wave mixing of the SBS pulse.

The signal beam is at a signal wavelength, the SPINS light is at SPINS wavelengths longer than the signal wavelength, and the filter may be configured to provide at least 30 dB of rejection at the SPINS wavelengths. For instance, the signal wavelength may be about 1064 nm and SPINS wavelengths may fall between about 1100 nm and about 1200 nm. The filter's reject band can extends over a 10% gain bandwidth of the first stage.

The multi-stage fiber amplifier may also include an optical isolator, in optical communication with the output of the first stage and the input of the second stage, to isolate the first stage from back-reflections from the second stage at a wavelength of the signal beam. The filter can be integrated with the optical isolator. The filter's passband can at least partially overlaps with a reject band of the optical isolator. In some cases, the filter's passband is narrower than the reject band of the optical isolator.

Another multi-stage fiber amplifier includes a first amplifier stage, an optical isolator, a second amplifier stage, and a filter. The filter has a passband comprising the signal wavelength and narrower than the reject band of the isolator. The filter provides suppression of at least 30 dB outside the passband and over substantially all of a gain band of the first amplifier stage.

The first and second amplifier stages amplify the signal beam which generates a backward-propagating SBS that induces nonlinear generation of a (broadband) backward-propagating pulse. The optical isolator, which is in optical communication with an output of the first amplifier stage, transmits the forward-propagating signal beam and blocks backward-propagating light in a reject band comprising the signal wavelength. And the filter, which is in optical communication with an output of the first amplifier stage and an input of the second amplifier stage, transmits the forward-propagating signal beam from the first stage to the second stage and blocks the (broadband) backward-propagating pulse.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
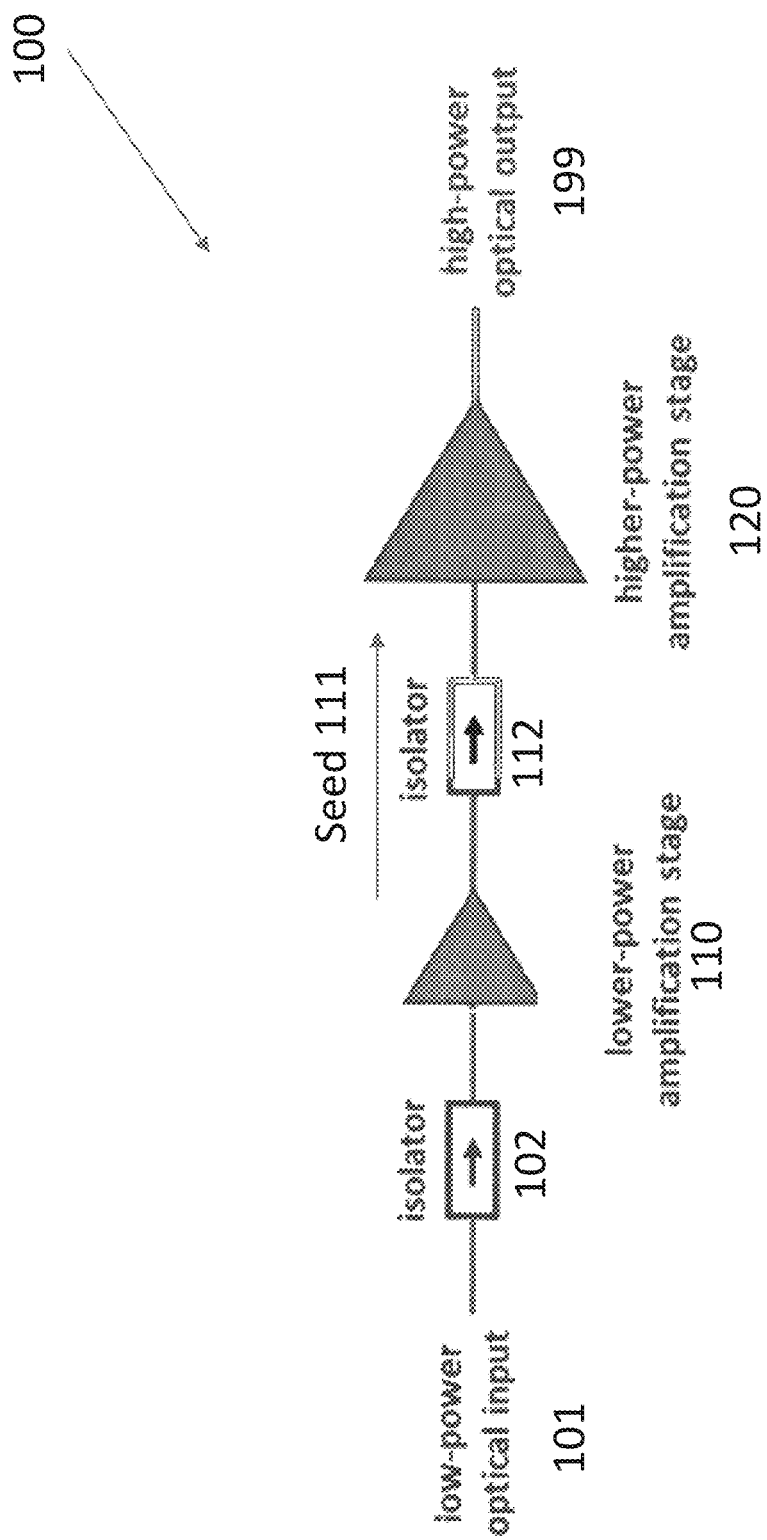
FIG. 1 shows two stages of a multi-stage, high-power fiber amplifier.
Figure 2A:
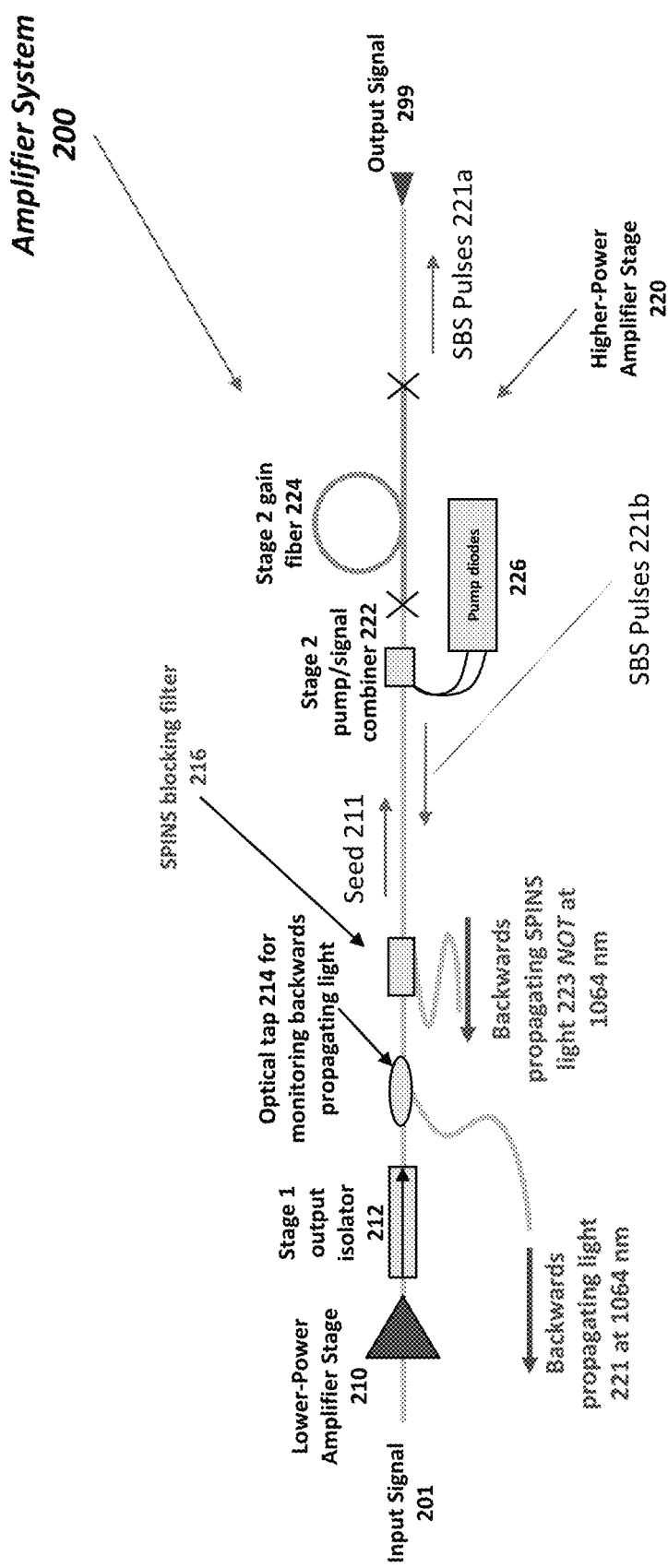
FIG. 2A illustrates the SBS-to-SPINS backwards pulse cascade in a multi-stage, high-power fiber amplifier.
Figure 2B:
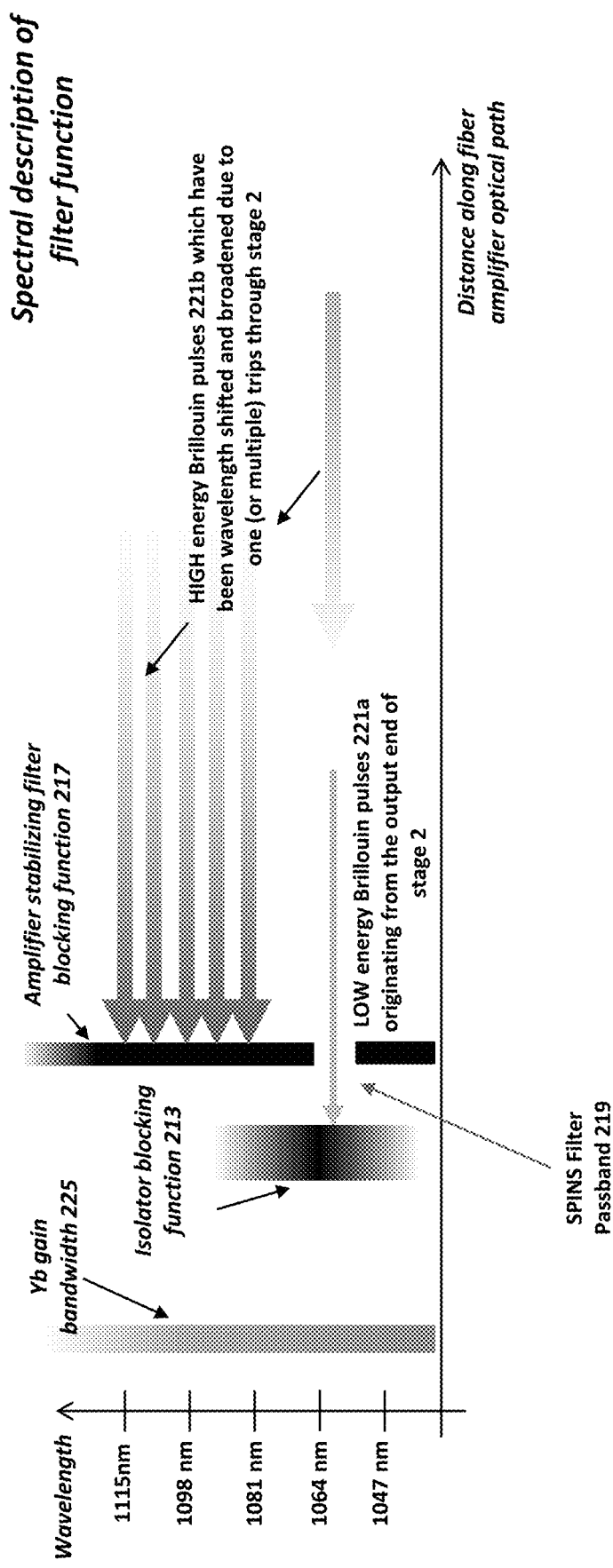
FIG. 2B shows the Ytterbium amplifier gain band, isolator reject band, and SPINS filter pass and reject bands for the multi-stage, high-power fiber amplifier of FIG. 2A.

FIGS. 2A and 2B illustrate an SBS-to-SPINS backward pulse cascade that produces backward-propagating SPINS light 223 in the higher-power stage 220 of a multi-stage fiber amplifier 200. It also shows a SPINS-blocking filter 216 that prevents this pulse cascade from propagating backward and disturbing or destroying the seed 211 for the higher-power stage 220. The example in FIGS. 2A and 2B is for a fiber amplifier 200 using ytterbium-doped fiber. The same sequence of events can happen in fiber amplifiers with other gain media—an erbium-doped or thulium-doped fiber amplifier, for example—so long as the SPINS wavelengths overlap with the gain bandwidth of the fiber's rare-earth dopant.

In the amplifier 200 in FIG. 2A, a first amplifier stage 210 amplifies a signal beam 201 at a wavelength of 1064 nm. A first-stage output isolator 212 transmits the amplified signal beam 211 to a second amplifier stage 220 via an optical tap 214 for monitoring backward-propagating light 221 at the signal wavelength (1064 nm) and a SPINS-blocking filter 216 to the second gain stage 220, which includes a ytterbium-doped fiber 224 pumped with light from pump diodes 226. A pump/signal combiner 222 couples light from the pump diodes and the amplified signal beam 211 into the ytterbium-doped fiber 224.

FIG. 2B shows that the ytterbium-doped fiber in both amplifier stages 210, 220 has a gain band 225 that extends from less than 1047 nm to more than 1115 nm. In the second amplifier stage 220, the ytterbium-doped fiber 224 amplifies the forward-propagating 1064-nm signal beam and produces a continuum of backward-propagating Brillouin pulses, which are shifted by approximately 16 GHz below the 1064 nm signal wavelength. These pulses can be characterized as low-energy backward-propagating Brillouin pulses 221a, which do not generate SPINS light, and high-energy backward-propagating Brillouin pulses 221b, which are intense enough to generate SPINS light 223. This SPINS light 223 has a spectrum wider than the spectrum of the input signal 201. The low-energy backward-propagating Brillouin pulses 221a are blocked by the first-stage optical isolator 212, whose rejection band 213 extends from about 1047 nm to about 1090 nm (a band of about 40 nm centered at or near the signal wavelength of 1064 nm).

The high-energy Brillouin pulses 221b may propagate back-and-forth through the second amplifier stage 220 and can be SPINS-shifted to longer wavelengths, producing SPINS light 223 at wavelengths within the ytterbium gain band 225. That is, the high-energy Brillouin pulses 221*b* undergo one or more nonlinear processes, including but not limited to stimulated Raman scattering (SRS), Self-Phase Modulation (SPM), or Four-Wave Mixing (FWM), that generate SPINS light 223 that is both relatively far from the signal wavelength and within the amplifier's gain band 225. The SPINS wavelengths largely fall outside the isolator's rejection band 213 and are blocked by the SPINS-blocking filter 216, which transmits light at 1064 nm.

FIG. 2B shows the SPINS-blocking filter's blocking function 217, which in this case has a passband 219 that is narrower than and overlaps with the isolator's reject band 213. The SPINS-blocking filter 216 transmits light in a narrow band (e.g., 10-20 nm). Its passband 219 includes and may be centered on or near the amplifier's operating wavelength (here, 1064 nm). The suppression provided by the SPINS-blocking filter's transmission function 217 may be 30 dB or more (e.g., 35 dB, 40 dB, 45 dB, and so on) at wavelengths outside the passband 219. As shown in FIG. 2B, this suppression may extend across all or substantially all of the gain band. More specifically, the suppression may extend over at least the 10% gain bandwidth (i.e., the bandwidth over which the emission cross section exceeds 10% of the peak value, e.g., 900-1200 nm for Yb) of the gain fibers. Kilowatt amplifiers are pumped very aggressively, so there can be a lot of large small-signal gain bandwidth that can become available if there is suddenly no seed light to saturate them.

The SPINS-blocking filter 216 can be placed in a variety of locations in the amplifier system 200 of FIG. 2A, with the optimal location depending on the application. For instance, it can be placed between the isolator 212 and the pump/signal combiner 222 as shown in FIG. 2A. It can also be place between the output of the lower-power amplifier stage 210 and the input of the isolator 212. Or it can be placed between the output of the pump/signal combiner 222 and the gain fiber 224 in the higher-power amplifier stage 220. This would prevent SPINS light 223 generated in the gain fiber 224 from disrupting the operation of the pump diodes 226. The amplifier system 200 could also include several SPINS-blocking filters 216, with one filter in each of these locations. These filters 216 can be implemented as discrete components or as fiber Bragg gratings as explained below.

Figure 3A:
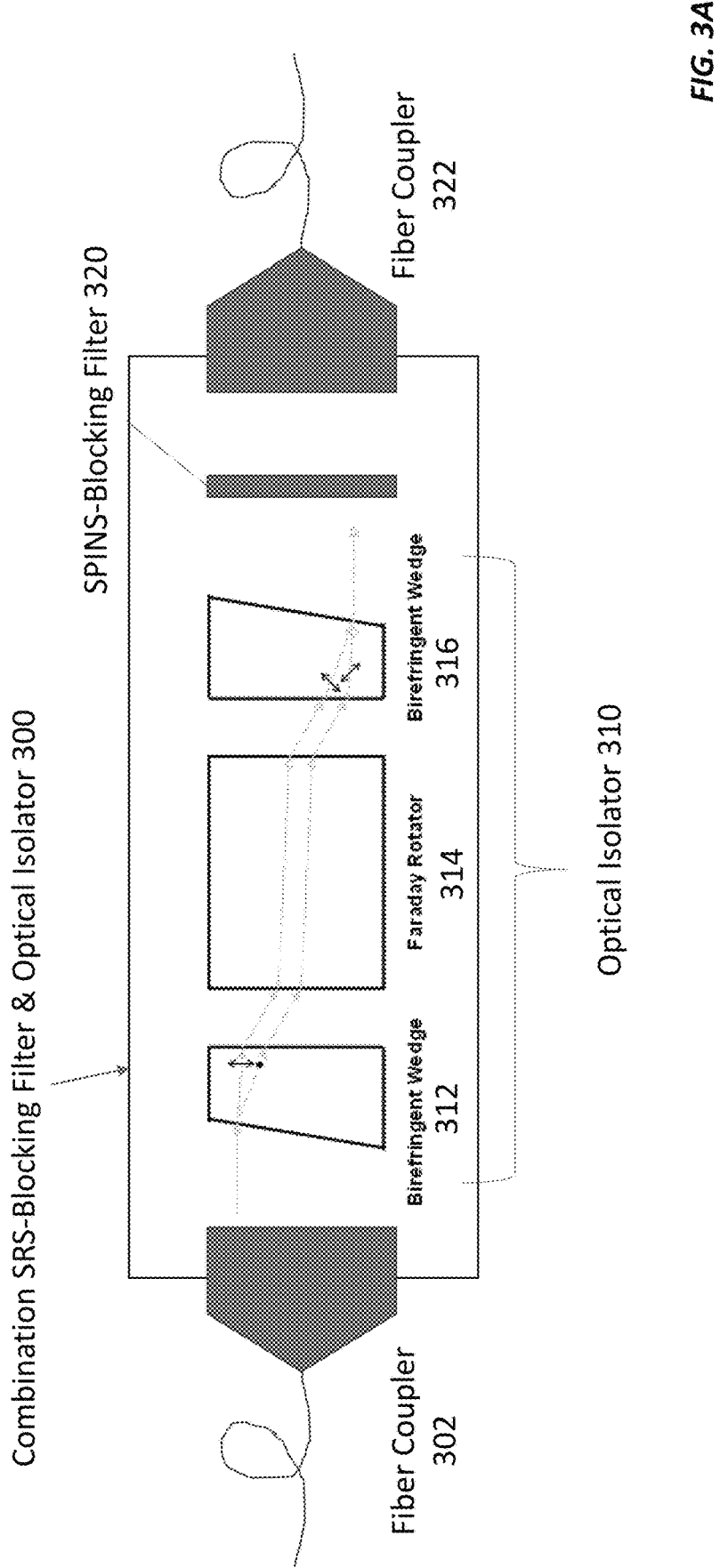
FIG. 3A shows a combination isolator/filter suitable for preventing backward-propagating SPINS pulses from disrupting a seed in a multi-stage, high-power fiber amplifier.

FIG. 3A shows a combination filter/isolator 300 that includes a SPINS-blocking filter 320 integrated with an optical isolator 310. If the filter 320 and the isolator 310 include discrete components, combining them into a single package reduces the number of times light is coupled into and out of optical fiber. This eases the alignment burden, reduces insertion loss, and reduces the optical fiber management effort.

Figure 3B:
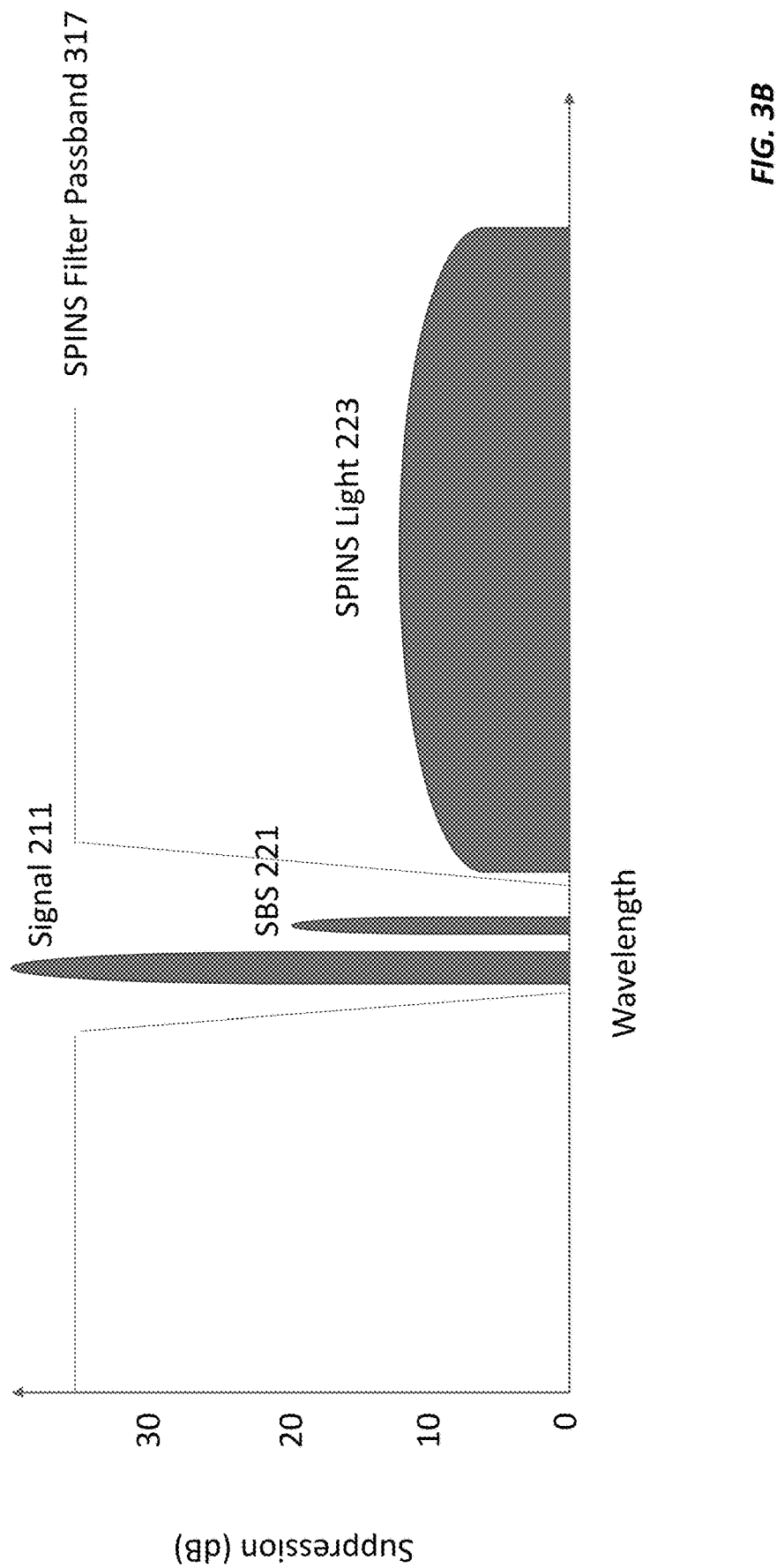
FIG. 3B shows the passband of the filter in FIG. 3A.

The combined filter/isolator 300 in FIG. 3A includes a first fiber coupler 302 that couples light from an optical fiber (e.g., from a first amplifier stage) into free space. The free-space beam propagates through the (polarization insensitive or polarization maintaining) isolator 310, which can be implemented as a Faraday rotator 314 between a pair of birefringent wedges 312 and 316. In this case, the filter 320 is a discrete dielectric thin-film component that sits between the isolator 310 and a second fiber coupler 322. The filter 320 can also be implemented as thin-film dielectric coatings on the fiber couplers 302 and 322, Faraday rotator 314, and/or the birefringent wedges 312 and 316 or as a spatial filter. The filter 320 transmits light at and near the signal wavelength, including the signal 211 and the SBS pulses 221, and attenuates or reflects light 223 at the SPINS wavelengths, such as stimulated Raman scattering (SRS) light, as illustrated by the filter passband 317 in FIG. 3B.

A SPINS-blocking filter (e.g., filter 216 in FIG. 2B or filter 320 in FIG. 3B) is different from a filter used to block amplified stimulated emission (ASE). ASE filters are commonly used between stages in fiber amplifiers and are often packaged with isolators. They prevent ASE generated in the lower-power stage from seeding ASE in the higher-power stage and degrading its performance. Like the SPINS-blocking filters described above, ASE filters are notch filters that pass light at the operating wavelength of the amplifier and block light over the remainder of the amplifier's gain bandwidth. However, for ASE filters the attenuation of the blocked wavelengths is well below the amount of attenuation provided by a SPINS-blocking filter for protection against backward-propagating SPINS light. Moreover, the attenuation provides by an ASE filter typically drops at wavelengths below 1055 nm and above 1150 nm. Typically, 10 dB to 20 dB of attenuation near the signal wavelength is adequate for ASE filters, while SPINS-blocking filters may provide attenuation of 30 dB, 35 dB, 40 dB, or more across the entire gain bands. Appropriate SPINS-blocking filters can also serve as ASE filters.

The rationale for the increased attenuation of the SPINS filter is as follows. Consider a three-stage fiber amplifier. An SBS pulse typically originates at the output end of the third stage of the fiber amplifier where the output power is highest because the light has already experienced the full gain of the amplifier. Upon generation, the SBS pulse travels backward (upstream) through the amplifier. This SBS pulse, being generated at the output end of the amplifier, has a peak power equal to the CW output power of the amplifier (generally 20 dB more than the seed level). Travelling back through the amplifier, this pulse then experiences the full gain of the amplifier, for a total of 40-60 dB of gain over the input signal. At this power level, the SBS pulse power is well above the rated power level of the isolator between the first and second amplifier stages.

An ASE filter with only 10 dB to 20 dB of blocking (suppression) cannot suppress the backward-travelling SBS pulse, which is within the ASE filter's passband and may enter the output of the second stage at a power level 30-50 dB above the power exiting the second stage. This backward-travelling pulse then proceeds through the second stage, temporarily reversing the direction of operation of the second-stage amplifier. During this time, without a seed to saturate it, gain builds up in the third stage, ready for extraction once the second stage turns back on, likely setting the SBS pulse generation process in motion again. A filter that prevents the passage of SPINS light from the third stage to the second has adequate blocking (e.g., suppression of 40 dB or more) to prevent the output of the second stage from being disrupted.

Alternatively, the SPINS-wavelength blocking function can be implemented as a wavelength-filtering fiber Bragg grating. A fiber Bragg grating is with a fiber core whose refractive index varies periodically. A SPINS-blocking fiber Bragg grating transmits light over a narrow wavelength region (e.g., <10 nm, <5 nm, or <1 nm) and dissipates light at wavelengths outside the passband into the cladding of the fiber. Such a fiber can produce a loss of 30 dB/m or more at the SPINS wavelength with minimal loss at the signal wavelength. It can be used as the output fiber of an isolator, in addition to or instead of a dielectric filter integrated with the isolator as shown in FIG. 3A and described above.

A SPINS-filtering fiber Bragg grating could also act as a pre-filter for any dielectric filter included inside the isolator.

For instance, a SPINS-filter fiber Bragg grating could connect the output of an upstream amplifier stage to the input of an isolator. This would reduce the amount of optical fiber for the SBS pulse to generate spectrum in before entering the next gain stage.

Such a fiber could be used for SPINS filtering as described here when the peak power of the SPINS pulses exceeds the damage threshold (e.g., 1 $GW/cm^2$) of the materials used to construct the dielectric filter described above. By dissipating the high energy of the SPINS-shifted pulse over a length of fiber rather than impinging the full energy on the dielectric filter, higher pulse energies (e.g., 10-100 mJ for a kilowatt-class amplifier with 30 dB of gain in the last stage) can be effectively suppressed. Implementing both the dielectric filter and wavelength-filtering fiber may also be beneficial for realizing the full benefit of SPINS filtering.

Experimentally, using a SPINS-blocking filter yielded a 16% increase in the achievable output power from a kilowatt-class fiber amplifier. This increase could be increased further by scaling up the power of the amplifier and tailoring the SPINS-blocking filter. It can also be applied at any suitable signal and SPINS wavelength for any suitable fiber gain medium and gain band.

Figure 4:
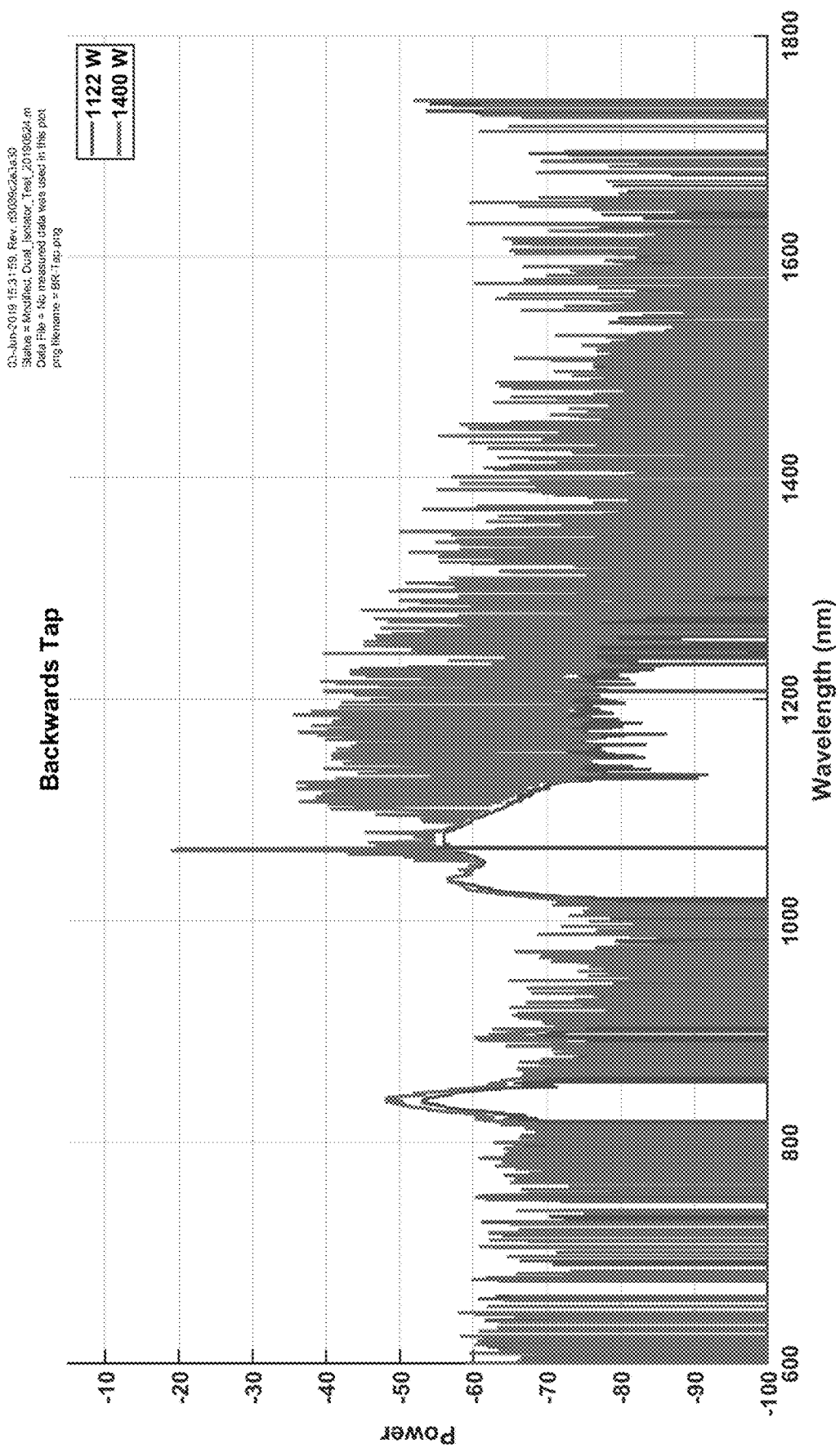
FIG. 4 shows the optical spectrum for SPINS light (e.g., "backwards propagating light 223 NOT at 1064 nm" in FIG. 2A).

FIG. 4 shows measured optical spectra of backward-propagating SPINS light (e.g., the SPINS light 223 to the right of the 1064 nm bandpass filter in FIG. 2A) between stages of a multi-stage fiber amplifier at output power levels of 1122 W (lower trace) and 1400 W (upper trace). These optical spectra lack distinct peaks at the Raman wavelength. Instead, they are nearly continuous spectra extending from 1100 nm out to possibly beyond 1600 nm. The optical spectrum analyzer used to measure these traces does not report the spectra as continuous spectra because the pulses that generate the spectra occur aperiodically, e.g., only a few times per sweep, and are very short in duration. As a result, the measured spectra are very jagged and spikey because the optical spectrum analyzer reports each spectrum as the pulses arrive and reports a normal background otherwise. Averaging or integrating sweeps could eliminate the spikes caused by the pulsing.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A multi-stage fiber amplifier comprising:
   a first stage to amplify a signal beam;
   a second stage to further amplify the signal beam, the signal beam generating a backward-propagating stimulated Brillouin scattered (SBS) pulse; and
   a filter, in optical communication with an output of the first stage and an input of the second stage, to transmit the signal beam from the first stage to the second stage and to prevent SBS-pulse induced non-linear spectrum (SPINS) light generated by the backward-propagating SBS pulse from propagating backward from the second stage to the first stage,
   wherein the signal beam is at a signal wavelength, the SPINS light is at SPINS wavelengths longer than the signal wavelength, and the filter is configured to provide at least 30 dB of rejection at the SPINS wavelengths.

2. The multi-stage fiber amplifier of claim 1, wherein the signal wavelength is about 1064 nm and SPINS wavelengths fall between about 1100 nm and about 1200 nm.

3. A multi-stage fiber amplifier comprising:
   a first stage to amplify a signal beam;
   a second stage to further amplify the signal beam, the signal beam generating a backward-propagating stimulated Brillouin scattered (SBS) pulse; and
   a filter, in optical communication with an output of the first stage and an input of the second stage, to transmit the signal beam from the first stage to the second stage and to prevent SBS-pulse induced non-linear spectrum (SPINS) light generated by the backward-propagating SBS pulse from propagating backward from the second stage to the first stage,
   wherein the filter has a reject band that extends over a 10% gain bandwidth of the first stage.

4. The multi-stage fiber amplifier of claim 1, wherein the SPINS light comprises light generated by at least one of stimulated Raman scattering, self-phase modulation, or four-wave mixing of the SBS pulse.

5. The multi-stage fiber amplifier of claim 1, further comprising:
   an optical isolator, in optical communication with the output of the first stage and the input of the second stage, to isolate the first stage from back-reflections from the second stage at a wavelength of the signal beam.

6. The multi-stage fiber amplifier of claim 5, wherein the filter is integrated with the optical isolator.

7. The multi-stage fiber amplifier of claim 5, wherein the filter has a filter passband that at least partially overlaps with a reject band of the optical isolator.

8. The multi-stage fiber amplifier of claim 7, where the filter passband is narrower than the reject band of the optical isolator.

9. A method of amplifying a signal beam at a first wavelength with a multi-stage fiber amplifier, the method comprising:
   amplifying the signal beam with a first stage of the multi-stage fiber amplifier;
   amplifying the signal beam with the second stage of the multi-stage fiber amplifier, the signal beam generating a backward-propagating stimulated Brillouin scattered (SBS) pulse at a second wavelength greater than the first wavelength, the backward-propagating SBS pulse inducing nonlinear generation of a backward-propagating pulse comprising at least one spectral component at a third wavelength greater than the second wavelength; and
   preventing the backward-propagating pulse from propagating backward to the first stage of the multi-stage fiber amplifier,
   wherein preventing the backward-propagating pulse from propagating backward to the first stage comprises attenuating the backward-propagating pulse by at least 30 db.

10. A method of amplifying a signal beam at a first wavelength with a multi-stage fiber amplifier, the method comprising:
    amplifying the signal beam with a first stage of the multi-stage fiber amplifier;
    amplifying the signal beam with the second stage of the multi-stage fiber amplifier, the signal beam generating a backward-propagating stimulated Brillouin scattered (SBS) pulse at a second wavelength greater than the first wavelength, the backward-propagating SBS pulse inducing nonlinear generation of a backward-propagating pulse comprising at least one spectral component at a third wavelength greater than the second wavelength; and
    preventing the backward-propagating pulse from propagating backward to the first stage of the multi-stage fiber amplifier,
    wherein the first wavelength is about 1064 nm and the third wavelength is greater than about 1100 nm.

11. The method of claim 9, wherein the backward-propagating SBS pulse induces nonlinear generation of the backward-propagating pulse via at least one of stimulated Raman scattering, self-phase modulation, or four-wave mixing of the backward-propagating SBS pulse.

12. The method of claim 9, further comprising:
    transmitting the signal beam from the first stage to the second stage of the multi-stage fiber amplifier via an optical isolator.

13. The method of claim 12, wherein preventing the backward-propagating pulse from propagating backward to the first stage comprises rejecting the backward-propagating pulse with a filter that is integrated with the optical isolator.

14. The method of claim 12, wherein the filter has a filter passband that at least partially overlaps with a reject band of the optical isolator.

15. The method of claim 14, wherein the filter passband is narrower than the reject band of the optical isolator.

16. A multi-stage fiber amplifier for amplifying a forward-propagating signal beam at a signal wavelength, the multi-stage fiber amplifier comprising:

a first amplifier stage to amplify the signal beam;

an optical isolator, in optical communication with an output of the first amplifier stage, to transmit the forward-propagating signal beam and to block backward-propagating light in a reject band comprising the signal wavelength;

a second amplifier stage, in optical communication with the optical isolator, to further amplify the signal beam, the signal beam generating a backward-propagating stimulated Brillouin scattered (SBS) pulse, the backward-propagating SBS pulse inducing nonlinear generation of a backward-propagating pulse; and a filter, in optical communication with an output of the first amplifier stage and an input of the second amplifier stage, to transmit the forward-propagating signal beam from the first stage to the second stage and to block the backward-propagating pulse, the filter have a passband comprising the signal wavelength and narrower than the reject band of the optical isolator, the filter having a suppression of at least 30 dB outside the passband and over substantially all of a gain band of the first amplifier stage.

* * * * *